(12) United States Patent
Sugino et al.

(10) Patent No.: US 7,235,987 B2
(45) Date of Patent: Jun. 26, 2007

(54) SENSOR DEVICE USING PAIR OF RESISTIVE SENSOR CONTROLLED BEAT OSCILLATORS

(75) Inventors: Masayoshi Sugino, Anjo (JP); Noriyasu Amano, Gamagori (JP); Kiyotaka Inoue, Okazaki (JP); Masao Kano, Gamagori (JP)

(73) Assignees: DENSO Corporation, Kariya, Aichi-pref. (JP); Nippon Soken, Inc., Nishio, Aichi-pref. (JP)

( * ) Notice: Subject to any disclaimer, the term of this patent is extended or adjusted under 35 U.S.C. 154(b) by 0 days.

(21) Appl. No.: 11/485,381

(22) Filed: Jul. 13, 2006

(65) Prior Publication Data

US 2007/0018660 A1  Jan. 25, 2007

(30) Foreign Application Priority Data

Jul. 19, 2005  (JP)  ............................. 2005-208417

(51) Int. Cl.
  *G01R 27/08*  (2006.01)
(52) U.S. Cl. ........................ 324/691; 324/693; 324/684

(58) Field of Classification Search ................ 324/693, 324/691, 684
See application file for complete search history.

(56) References Cited

U.S. PATENT DOCUMENTS

| | | | |
|---|---|---|---|
| 5,044,343 A * | 9/1991 | Kanno et al. ................ | 123/493 |
| 6,223,593 B1 * | 5/2001 | Kubisiak et al. .......... | 73/204.15 |
| 6,385,273 B1 * | 5/2002 | Hsu et al. ...................... | 377/19 |
| 2005/0184876 A1 * | 8/2005 | Tokudome ................ | 340/573.1 |

FOREIGN PATENT DOCUMENTS

| | | |
|---|---|---|
| JP | 9-147283 | 6/1997 |
| JP | 2001-91387 | 4/2001 |
| JP | 2003-273673 | 9/2003 |

* cited by examiner

*Primary Examiner*—Walter Benson
(74) *Attorney, Agent, or Firm*—Nixon & Vanderhye P.C.

(57) ABSTRACT

A sensor device is disclosed that includes a sensor, in which a resistance value is changed in accordance with a change in an environment of the sensor. The sensor device also includes a beat oscillator having plural oscillators of different oscillating frequencies. The beat oscillator generates a beat signal of a frequency lower than the oscillating frequencies. The beat signal corresponds to a difference of the oscillating frequencies. The beat oscillator is electrically connected to the sensor such that the frequency of the beat signal changes in accordance with the changes in the resistance value of the sensor.

6 Claims, 5 Drawing Sheets ance value is changed in accordance with a change in an environment of the sensor. The sensor device also includes a beat oscillator having plural oscillators of different oscillating frequencies. The beat oscillator generates a beat signal of a frequency lower than the oscillating frequencies. The beat signal corresponds to a difference of the oscillating frequencies. The beat oscillator is electrically connected to the sensor such that the frequency of the beat signal changes in accordance with the changes in the resistance value of the sensor.

SENSOR DEVICE USING PAIR OF RESISTIVE SENSOR CONTROLLED BEAT OSCILLATORS

CROSS REFERENCE TO RELATED APPLICATION

The following is based on and claims the benefit of priority from Japanese Patent Application 2005-208417, filed Jul. 19, 2005, and is incorporated herein by reference.

FIELD OF THE INVENTION

The present invention relates to a sensor device using a sensor in which a resistance value is changed in accordance with a change in the environment.

BACKGROUND ART

Sensor devices have been proposed that include a sensor. Resistance values in the sensor change according to changes in the environment (e.g., pressure changes, air temperature changes, humidity changes, etc.). The environment change is detected based on the resistance change.

In Japanese Patent Publication No. 9-147283, for instance, an oscillating frequency of a CR oscillating circuit changes according to the sensor resistance value changes caused by environment changes (e.g., a change of density of a measured object due to moisture, etc.). A square wave pulse signal of a frequency corresponding to this oscillating frequency is outputted. The change of density is detected on the basis of a changing ratio of the oscillating frequency with respect to a fundamental oscillating frequency.

However, when the density change is small, the change of the resistance value of the sensor is small, and the changing ratio of the oscillating frequency is also small. Accordingly, it is difficult to detect a slight density change.

If an output bit number of an A/D converter is increased, the resolution of the sensor output can be improved. However, a data width of the sensor output is widened by increasing the output bit number. Accordingly, processing load of the sensor output is increased.

Further, an input voltage of the A/D converter is an electric power voltage or less. Accordingly, for example, when the electric power voltage is a low voltage (e.g., several V to ten several V) and the resolution is improved by increasing the output bit number of the A/D converter, a minimum detecting voltage unit is reduced. As a result, if noise is included in the input voltage of the A/D converter, the A/D converter will easily detect the noise.

Moreover, when a dynamic range of the detecting object is wide and the detection is to be performed by one sensor, the resolution is reduced. On the other hand, when the detecting range is borne by plural sensors, the number of parts is increased.

Therefore, as shown in Japanese Patent Publication No. 2003-273673, an analog circuit for adjusting a gain or an offset may be added to a detecting circuit of the sensor output. However, using this device, the circuit scale becomes relatively large.

Accordingly, there remains a need for a sensor device having high resolution, a wide detecting range, and a small scale.

SUMMARY OF THE INVENTION

A sensor device is disclosed that includes a sensor, in which a resistance value is changed in accordance with a change in an environment of the sensor. The sensor device also includes a beat oscillator having plural oscillators of different oscillating frequencies. The beat oscillator generates a beat signal of a frequency lower than the oscillating frequencies. The beat signal corresponds to a difference of the oscillating frequencies. The beat oscillator is electrically connected to the sensor such that the frequency of the beat signal changes in accordance with the changes in the resistance value of the sensor.

DESCRIPTION OF THE PREFERRED EMBODIMENTS

Plural embodiments of the present invention will next be explained on the basis of the drawings.

Figure 1:
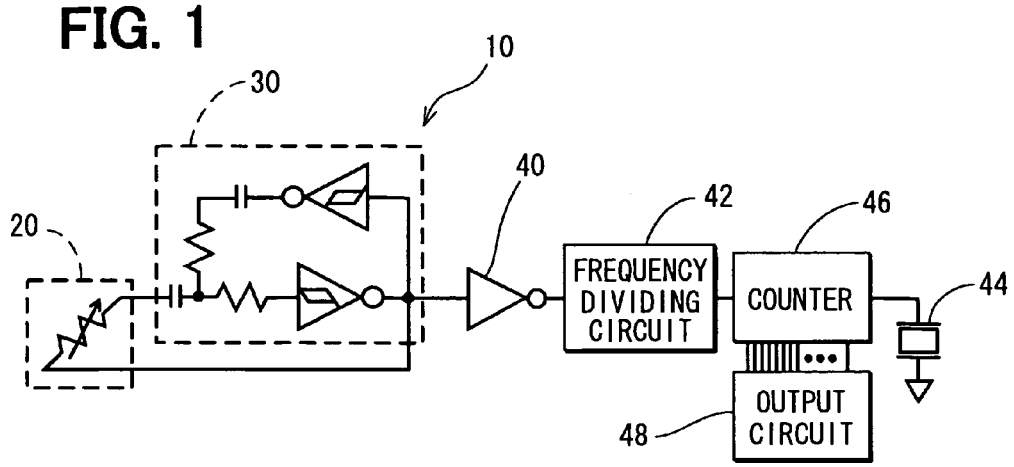
FIG. 1 is a schematic view of one embodiment of a sensor device according to the present invention.

FIG. 1 shows a sensor device 10 in accordance with a first embodiment of the present invention. The sensor device 10 includes a sensor 20, a beat oscillator 30, an inverter 40, a frequency dividing circuit 42, a clock oscillator 44, a counter 46, an output circuit 48, etc.

The sensor 20 is a resistor in which a resistance value is changed in accordance a change in the environment surrounding the sensor 20. In one embodiment, the resistance value changes according to a change in the pressure in the environment. In other words, in this embodiment, the sensor 20 is a pressure sensor.

The beat oscillator 30 is constructed by a plurality of CR oscillators of different oscillating frequencies. The beat oscillator 30 generates a beat signal of a frequency lower than an oscillating frequency of each CR oscillator by a difference of the oscillating frequencies of one set of CR oscillators. In other words, the beat signal is generated by an interference of the oscillating frequencies of each CR oscillator, and the beat signal corresponds to a difference of the two oscillating frequencies.

The beat oscillator 30 is electrically connected to the pressure sensor 20 as shown in FIG. 1. Accordingly, when the resistance value of the pressure sensor 20 changes due to an environmental pressure change, the oscillating frequency of one CR oscillator of the beat oscillator 30 is changed according to the resistance change in the pressure sensor 20. The oscillating frequency changes significantly in comparison with the oscillating frequency of the other CR oscillator.

Figure 2A:
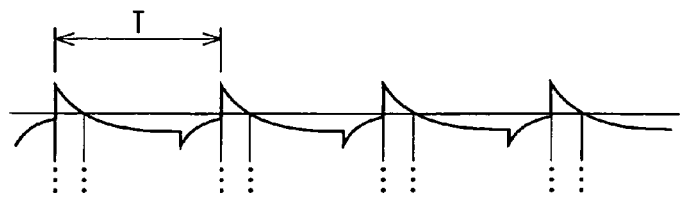
FIGS. 2A–2E are time charts showing signal states of the sensor device.
Figure 2B:
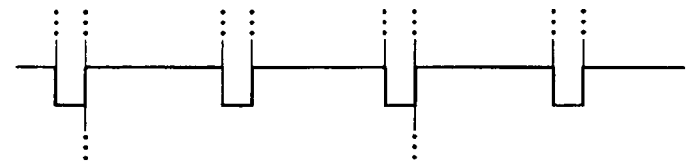

The inverter 40 shapes the waveform of the beat signal (see FIG. 2A) generated by the beat oscillator 30 to a square waveform with a predetermined threshold as a reference as shown in FIG. 2B. The waveform may be also shaped by a flip-flop or another circuit instead of the inverter 40.

Figure 2C:
Figure 2D:
Figure 2E:

The frequency dividing circuit 42 divides the frequency of the beat signal shaped in the waveform and generates a frequency dividing signal as shown in FIG. 2C. A degree of the frequency division using the frequency dividing circuit 42 is set according to a desired resolution for pressure detection. In the embodiment represented in FIG. 2C, two periods of the beat signal are set to a time width of the frequency dividing signal counted by the counter 46. The counter 46 counts the length of the time width of a predetermined portion of the frequency dividing signal as a clock pulse signal from an AND output (see FIG. 2E) of an output of the clock oscillator 44 (see FIG. 2D) and the frequency dividing signal shown in FIG. 2C. The output circuit 48 outputs a counting result of the counter 46.

In the sensor device 10 of FIG. 1, when the oscillating frequency of one CR oscillator is set to f1 and the oscillating frequency of the other CR oscillator is set to f2 (where f1 is greater than f2) with respect to the resistance value of the pressure sensor 20, a frequency f0 of the beat signal is shown by:

$$f0 = f1 - f2$$

The values of f1 and f2 are set such that f0 is a relatively small value. Next, when the resistance value of the pressure sensor 20 changes (i.e., when the environmental pressure changes), the oscillating frequency of one CR oscillator becomes f1+Δf, Δf is reflected in a change of the beat signal frequency. More specifically, the frequency of the beat signal becomes:

$$f1 + \Delta f - f2 = f0 + \Delta f$$

The period T of the beat signal (see FIG. 2A) is also changed by the change of frequency.

When the frequency of the beat signal changes, the length of the period of the frequency dividing signal (FIG. 2C) is also changed. Hence, the count number of the clock pulse counted by the counter 46 is also changed. Accordingly, the pressure change of the circumferential environment is detected as a change of the count number of the clock pulse counted by the counter 46.

When the resistance value of the pressure sensor 20 changes (i.e., when environment pressure changes) and the oscillating frequency in one CR oscillator is changed from f1 to (f1+Δf), a frequency changing ratio is (Δf/f1). Also, the changing ratio of the frequency of the beat signal is (Δf/f0). As mentioned above, f0 is set so as to be smaller than f1. Accordingly, the changing ratio of the frequency of the beat signal becomes greater than the changing ratio of the oscillating frequency of the CR oscillator. Similarly, the changing ratio of the period of the beat signal becomes greater than the changing ratio of an oscillating period of the CR oscillator.

When the beat oscillator 30 detects the change of the detecting signal of the pressure sensor 20 (as a frequency change or a period change), resolution of the pressure detection is improved in comparison with a case in which the CR oscillator as a simplex detects the change of the detecting signal of the pressure sensor 20 as a frequency change or a period change. Further, in this embodiment, the period is lengthened by dividing the frequency of the beat signal, and the pressure change is detected with this lengthened period as a count number of the clock pulse. Accordingly, accuracy of the pressure detection i.e., resolution) is further improved. Moreover, pressure changes of a wide dynamic range can be detected irrespective of the value of an electric power voltage by converting the pressure change into a frequency change or a period change.

Thus, since the change of the resistance value of the pressure sensor 20 is detected as the period change of the beat signal, the resolution can be improved by a small-scale circuit construction without using an analog circuit for adjusting gain or offset of the detecting signal of the pressure sensor 20. Further, since the period change of the beat signal is generated irrespective of the value of the electric power voltage, pressure can be detected with high resolution by the small-scale circuit construction even when the dynamic range of pressure detection is wide.

Further, since pressure is detected as a count number of the clock pulse as digital data, data inside the sensor device 10 and outside the sensor device 10 can be easily processed.

Figure 3:
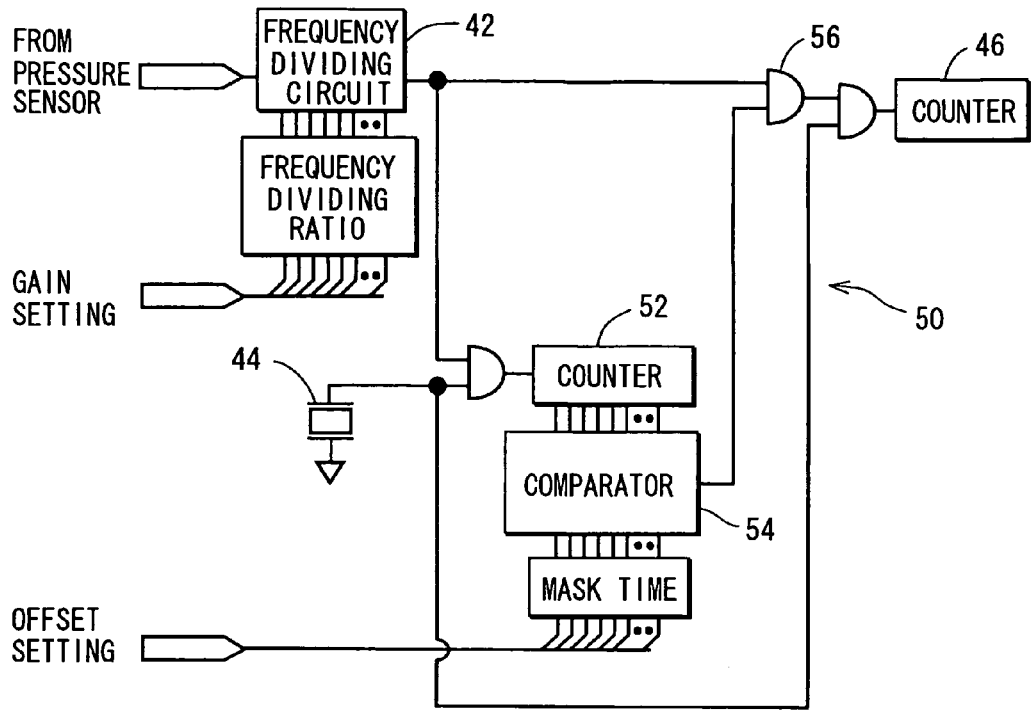
FIG. 3 is a schematic view of another embodiment of the sensor device.
Figure 5:
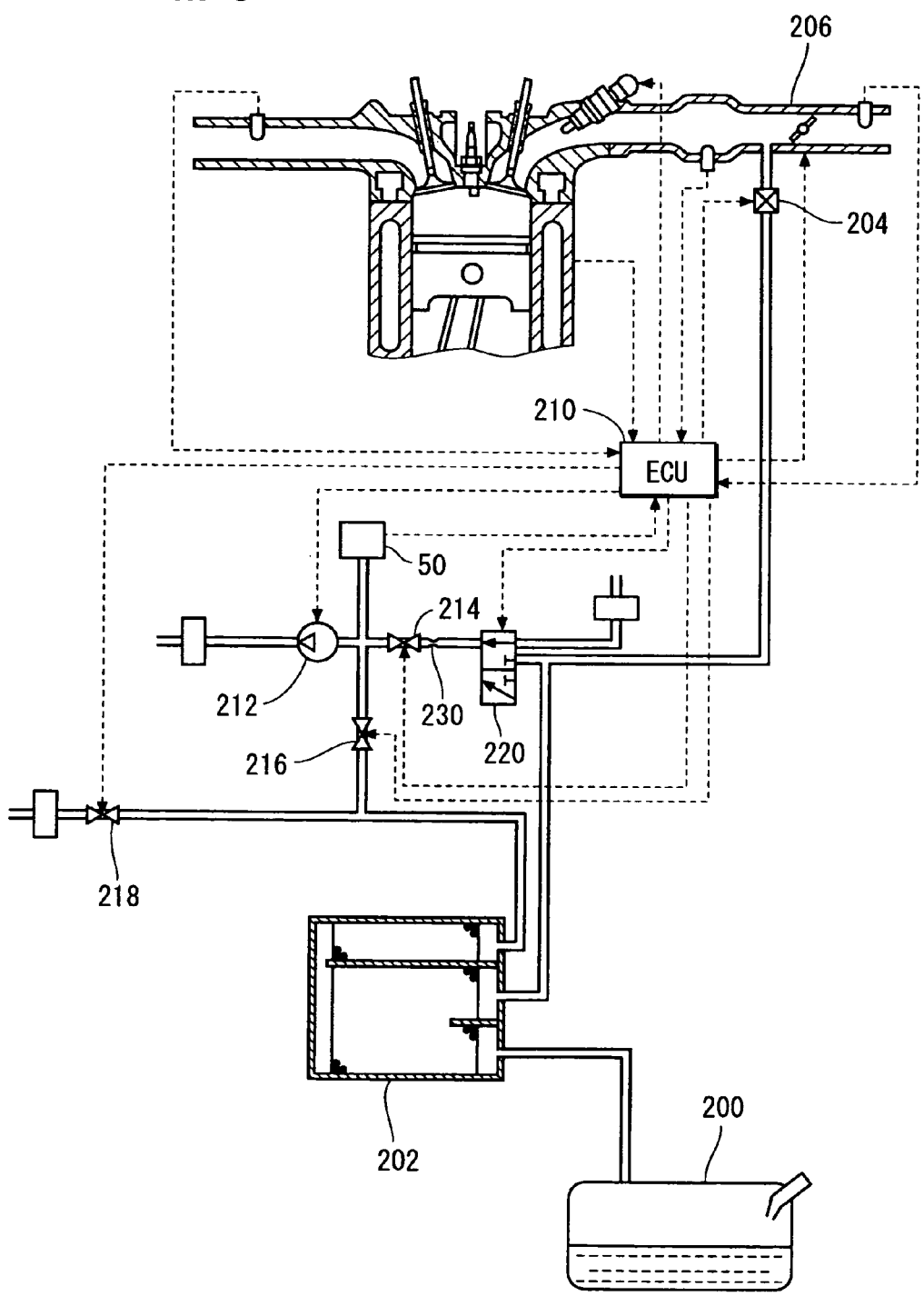
FIG. 5 is a schematic view of the evaporation fuel leakage inspector.

FIG. 3 shows a sensor device in accordance with a second embodiment of the present invention. FIG. 5 shows a leakage inspector of an evaporation fuel processor using the sensor device 50 of FIG. 3. Substantially similar components as those of the embodiment of FIG. 1 are designated by the same reference numerals.

First, the evaporation fuel processor shown in FIG. 5 will be briefly explained. Evaporation fuel generated within a fuel tank 200 is adsorbed to an adsorbent such as active carbon within a canister 202, etc. The evaporation fuel adsorbed to the canister 202 is purged from the canister 202 into an intake pipe 206. More specifically, the purge valve 204 is opened, causing negative pressure in the intake pipe 206 and causing the fuel to flow from the canister 202 into the intake pipe 206.

The evaporation fuel leakage inspector operates a pump 212 and electromagnetic valves 214, 216, 218, 220 by instructions transmitted from a controller 210 (e.g., ECU). The sensor device 50 measures the pressure of an intake side of the pump 212.

The evaporation fuel leakage inspector inspects leakage of the evaporation fuel processor and detects evaporation fuel density D of the purge valve 204 side of the canister 202. The evaporation fuel leakage inspector also controls an evaporation fuel amount when the evaporation fuel is purged from the canister 202 to the intake pipe 206.

Figure 6:
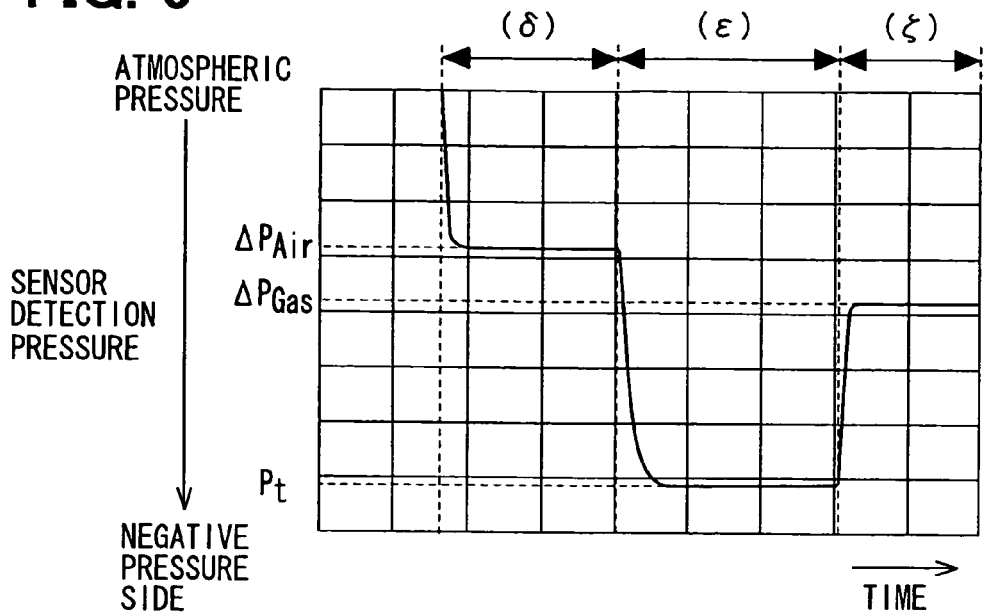
FIG. 6 is a graph showing the density measurement of the evaporation fuel leakage inspector.

First, the evaporation fuel leakage inspector opens the electromagnetic valve 214, closes the electromagnetic valve 216, and sets the electromagnetic valve 220 to a communicating state shown in FIG. 5. In this state, the ECU 210 controls the pump 212 such that air passes through a reference orifice 230, and the pressure of the intake side of the pump 212 (i.e., the downstream side of the reference orifice 230 becomes constant negative pressure $\Delta P_{Air}$ (see period δ of FIG. 6).

Further, when the electromagnetic valve 214 is closed in this state, the intake side of the pump 212 is blocked. Accordingly, pressure measured by the sensor device 50 is further reduced to the negative pressure side separated from the atmosphere, and becomes constant pressure $P_t$ (see period ε of FIG. 6).

Next, the electromagnetic valve 214 is opened from this state and fluidly connects the canister 202 and the reference orifice 230 by controlling the operation of the electromagnetic valve 220. Thus, the air/evaporation fuel mixture passes through the reference orifice 230. The pressure measured by the sensor device 50 is then raised towards atmospheric pressure, and becomes constant pressure $\Delta P_{Gas}$ (see period $\xi$ of FIG. 6). Since the evaporation fuel is included within the air in period $\xi$, the value of $\Delta P_{Gas}$ is lower than the value of $\Delta P_{Air}$.

The evaporation fuel density D (%) is calculated from $\Delta P_{Air}$, $P_t$ and $\Delta P_{Gas}$ according to the following formula:

$$D=100 \cdot \rho_{Air} \cdot \{1-(\Delta P_{Gas}/\Delta P_{Air}) \cdot (\Delta P_{Air}-P_t)^2/(\Delta P_{Gas}-P_t)^2\}/(\rho_{Air}-\rho_{HC})$$

In the formula, $\rho_{Air}$ is density of the air, and $\rho_{HC}$ is density of hydrocarbon (HC) (i.e., a component of the evaporation fuel). The evaporation fuel amount purged from the canister 202 to the intake pipe 206 is controlled on the basis of the calculated evaporation fuel density D.

Figure 4:
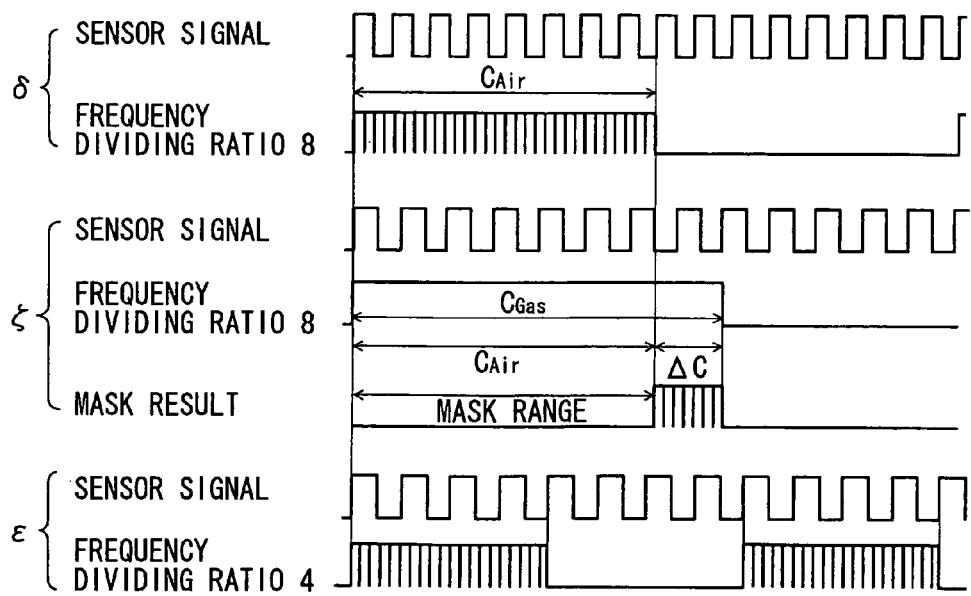
FIG. 4 is a time chart showing a signal state of each period of a density measurement in an evaporation fuel leakage inspector.

Next, the sensor device 50 used in the evaporation fuel leakage inspector will be explained. As shown in FIGS. 3 and 4, the frequency dividing circuit 42 of the sensor device 50 divides the frequency of the beat signal generated by the beat oscillator 30 on the basis of a frequency dividing ratio set in gain setting, and generates a frequency dividing signal. The frequency dividing signal of the remaining time is counted by a clock number, removing a mask time set in offset setting. Here, when a period time corresponding to n-waveforms of the sensor signal is counted, the frequency dividing ratio is shown as n.

More specifically, the detecting signal of the pressure sensor 20 is converted into the beat signal by the beat oscillator 30 and shaped in a waveform. In one embodiment, the oscillating frequency of one CR oscillator of the beat oscillator 30 is set to 2.5 MHz, and the oscillating frequency of the other CR oscillator is set such that the frequency of the beat signal becomes about 40 KHz. The beat signal is inputted to the frequency dividing circuit 42.

The frequency dividing circuit 42 divides the frequency of the detecting signal of the pressure sensor 20 on the basis of the set frequency dividing ratio, and generates a frequency dividing signal. Resolution is improved as the frequency dividing ratio set by the gain setting is increased. The frequency dividing ratio is set by the ECU 210 in accordance with periods $\delta$, $\epsilon$ and $\xi$ shown in FIG. 6.

Counters 46, 52 start counting when the frequency dividing signal increases and clear the count number when the frequency dividing signal decreases. The counter 52 counts the clock pulse number of a signal width amount of the frequency dividing signal before mask. A comparator 54 outputs an ON-signal when the count number of the counter 52 becomes equal to or more than a count number corresponding to a mask time set by the offset setting. The mask time is a count number corresponding to $\Delta P_{Air}$ detected in the above period $\delta$, and is set by the ECU 210. An output of the comparator 54 is turned off when the frequency dividing signal decreases. When no mask time is set, the comparator 54 consistently outputs the ON-signal. In contrast to this, when the mask time is set, one portion of the frequency dividing signal can be removed from a count object of the counter 46 by generating AND of the output signal of the comparator 54 and the frequency dividing signal by an AND circuit 56. Thus, the counter 52, the comparator 54, and the AND circuit 56 constitute a mask circuit.

When the evaporation fuel density is detected by an output of the sensor device 50, the values of $\Delta P_{Air}$ and $\Delta P_{Gas}$ are relatively similar values. Accordingly, $\Delta P_{Air}$ and $\Delta P_{Gas}$ are detected with high precision in comparison with $P_t$. Accordingly, as shown in FIG. 4, the frequency dividing ratio for dividing the frequency of the beat signal at the detecting time of $\Delta P_{Air}$ and $\Delta P_{Gas}$ is set so as to become greater than the frequency dividing ratio for dividing the frequency of the beat signal at a measuring time of $P_t$. For example, in FIG. 4, the frequency dividing ratio is set to 8 in periods $\delta$ and $\xi$, and the frequency dividing ratio is set to 4 in period $\epsilon$.

Since the values of $\Delta P_{Gas}$ and $\Delta P_{Air}$ are relatively similar values, the value of $\Delta P_{Gas}$ can be detected as a changing amount with respect to a detecting value of $\Delta P_{Air}$. Accordingly, as shown in FIG. 4, the pulse width of the remaining $\xi$ signal provided by masking a signal (shown as signal $\xi$) of the frequency dividing ratio 8 detected in period $\xi$ by a mask signal corresponding to the pulse width of a signal (shown as signal $\delta$) of the frequency dividing ratio 8 detected in period $\delta$ is counted ($\Delta C$). When the count number of signal $\delta$ is set to $C_{Air}$ and the count number of signal $\xi$ is set to $C_{Gas}$, a calculation is made according to the following equation:

$$C_{Gas}=C_{Air}+\Delta C$$

Thus, it is not necessary to count the entire pulse width of signal $\xi$, and a maximum value counted by the counter 46 is restrained to the magnitude of $C_{Air}$. Accordingly, the increase of a bit number of the counter 46 can be restrained.

Figure 7:
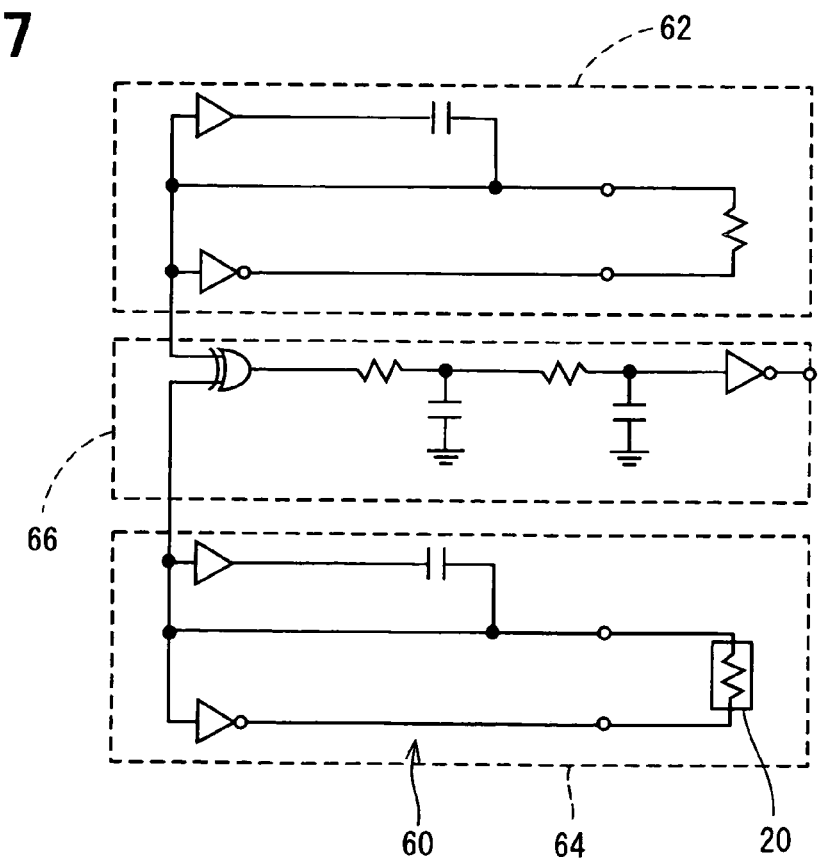
FIG. 7 is a schematic view of another embodiment of the sensor device.

FIG. 7 shows another embodiment of the beat oscillator 60. Components that are similar to previous embodiments are designated by similar reference numerals.

In this embodiment, the beat oscillator 60 generates a beat signal in a beat generating circuit 66 from a difference of frequencies of a reference oscillator 62 and a detection oscillator 64. Since the reference oscillator 62 and the detection oscillator 64 are separated, the oscillating frequency for each can be individually adjusted easily by changing the value of a capacitor or resistance.

Figure 8:
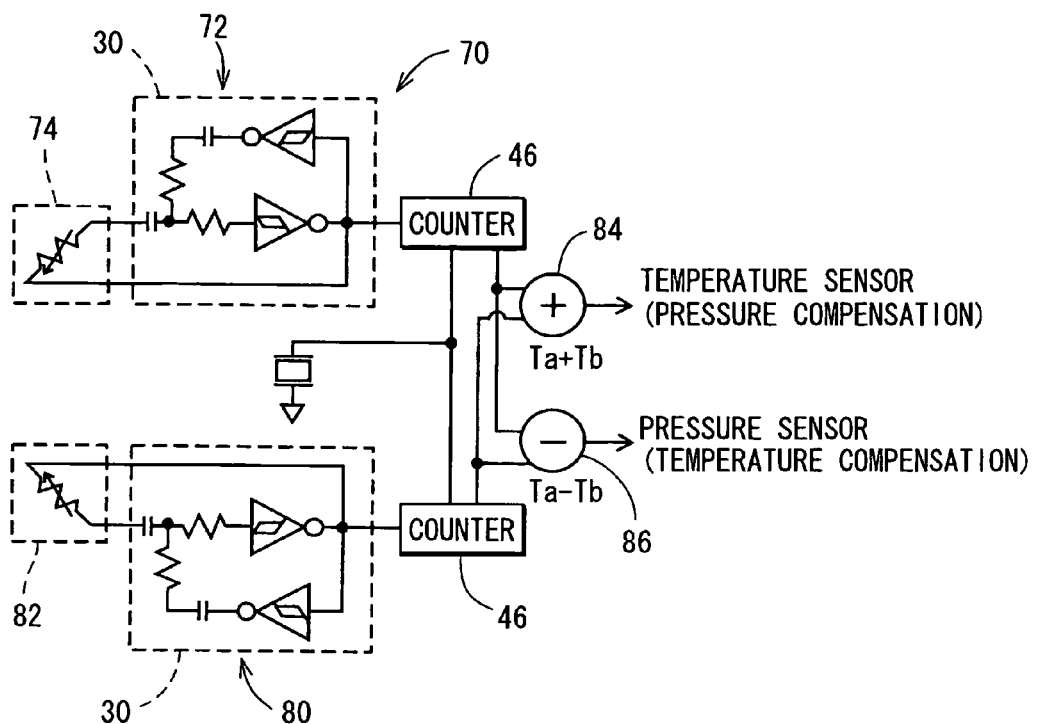
FIG. 8 is a schematic view of another embodiment of the sensor device.

FIG. 8 shows another embodiment of the sensor device. Components that are similar to previous embodiments are designated by similar reference numerals.

Figure 9:
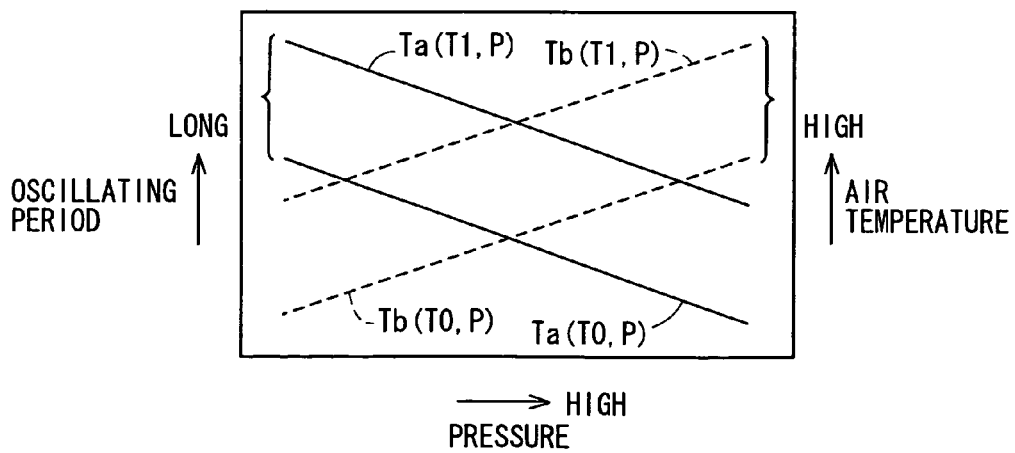
FIG. 9 is a graph showing the relation of pressure, temperature, and an oscillating period for the sensor device of FIG. 8.

The sensor device 70 is constructed from a plurality of sensor devices 72, 80. FIG. 9 shows characteristics of an oscillating period with respect to temperature and pressure of the sensor devices 72, 80. In FIG. 9, a solid line shows characteristics of oscillating period Ta of the sensor device 72, and a dotted line shows characteristics of oscillating period Tb of the sensor device 80.

The sensor device 72 includes a pressure sensor 74, and the sensor device 80 includes a pressure sensor 82. The resistance characteristics of each pressure sensor 74, 82 changes inversely in relation the other pressure sensor 74, 82. In other words, as shown in FIG. 9, when pressure is increased, oscillating period Ta is reduced in the sensor device 72 and oscillating period Tb is increased in the sensor device 80. On the other hand, when temperature rises (i.e., T0→T1) the resistance value rises and oscillating periods Ta, Tb of the sensor devices 72, 80 are lengthened for each sensor device 72, 80.

A pressure compensating section 84 calculates a sum of count numbers by counting the beat signal by a clock number and corresponding to (Ta+Tb) with respect to oscillating period Ta of the sensor device 72 and oscillating period Tb of the sensor device 80 having such characteristics. The sum of count numbers calculated by the pressure compensating section 84 becomes characteristics in which the oscillating period is changed by a temperature change irrespective of the pressure change. Namely, the sensor device 70 can be used as a temperature sensor device compensated in pressure.

Further, in a temperature compensating section 86, a difference of count numbers provided by counting the beat signal by the clock number and corresponding to (Ta−Tb) is calculated. The difference of count numbers calculated by the temperature compensating section 86 becomes characteristics in which the oscillating period is changed by the pressure change irrespective of the temperature change. Namely, the sensor device 70 can be used as a pressure sensor device compensated in temperature.

In the embodiment shown in FIG. 8, the counter 46 counts the time width of the beat signal generated by the beat oscillator 30. It will be appreciated, however, that the counter 46 may also count the time width of the frequency dividing signal divided in frequency with respect to each beat signal of the beat oscillator 30.

In this embodiment, since the beat signal is counted by the clock number, values corresponding to (Ta+Tb) and (Ta−Tb) can be easily calculated by the pressure compensating section 84 and the temperature compensating section 86 by a simple adding and subtracting calculation circuit, a microprocessor, etc.

In the embodiments discussed above, the pressure change of the surrounding environment is detected by the sensor device. However, the sensor device may also detect other environmental changes, such as temperature, humidity, etc.

Further, in accordance with resolution desired in the sensor device, the time width of a predetermined portion of the beat signal may be also counted without dividing the frequency of the beat signal. Namely, the frequency change may be also detected instead of the period change.

Thus, the present invention has been described in an illustrative manner. It is to be understood that the terminology, which has been used, is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A sensor device comprising:
    a sensor in which a resistance value is changed in accordance with a change in an environment of the sensor; and
    a beat oscillator having plural oscillators of different oscillating frequencies and generating a beat signal of a frequency lower than the oscillating frequencies, wherein the beat signal corresponds to a difference of the oscillating frequencies, and wherein the beat oscillator is electrically connected to the sensor such that the frequency of the beat signal changes in accordance with the change in the resistance value of the sensor;
    wherein the resistance value is changed in accordance with a pressure change in the environment,
    wherein the sensor has a first and second sensor, wherein the resistance values of the first and second sensors change inversely in relation to each other due to the pressure change of the environment;
    wherein the beat oscillator has a first beat oscillator electrically connected to the first sensor, wherein the frequency of the beat signal of the first beat oscillator changes in accordance with the resistance value of the first sensor;
    wherein the beat oscillator has a sensor beat oscillator electrically connected to the second sensor, wherein the frequency of the beat signal of the second beat oscillator changes in accordance with the resistance value of the second sensor; and
    further comprising a temperature compensating section for:
        calculating at least one of:
            the beat signals of the first and second beat oscillators; and
            a difference of a first and second frequency dividing signal provided by dividing the frequencies of the beat signals of the first and second beat oscillators;
        and compensating for detecting pressure with respect to temperature.

2. The sensor device according to claim 1, further comprising a frequency dividing circuit for generating a frequency dividing signal by dividing the frequency of the beat signal.

3. The sensor device according to claim 2, further comprising a counter for counting the time width of a predetermined portion of the frequency dividing signal by a pulse number.

4. The sensor device according to claim 3, wherein the sensor device further comprises a mask circuit for masking a portion of the frequency dividing signal and removing the portion from a count object of the counter.

5. The sensor device according to claim 3, wherein an output of the counter is digital data.

6. The sensor device according to claim 1, wherein the beat signal is generated by an interference of signals of two different frequencies and is outputted as a difference of these two different frequencies.

* * * * *